United States Patent [19]
Cosola

[11] Patent Number: 5,525,153
[45] Date of Patent: Jun. 11, 1996

[54] READY MIXED CEMENT PRODUCT INCORPORATING MATERIAL FROM CONSTRUCTION AND DEMOLITION DEBRIS

[76] Inventor: Michael Cosola, 54 Lincoln St., Elmont, N.Y. 11003

[21] Appl. No.: 416,162

[22] Filed: Apr. 4, 1995

[51] Int. Cl.⁶ .................................................. C04B 18/16
[52] U.S. Cl. ........................ 106/697; 106/711; 106/737; 106/738; 106/817
[58] Field of Search .................................... 106/697, 711, 106/817, 737, 738

[56] References Cited

U.S. PATENT DOCUMENTS

| | | | |
|---|---|---|---|
| 3,734,988 | 5/1973 | Aintablian | 106/697 |
| 3,902,912 | 9/1975 | Wolf | 106/711 |
| 4,726,530 | 2/1988 | Miller et al. | 241/24 |
| 4,946,505 | 8/1990 | Jungk | 106/712 |
| 5,108,697 | 4/1992 | Rirsch et al. | 106/711 |
| 5,224,774 | 7/1993 | Valle et al. | 366/2 |
| 5,298,071 | 3/1994 | Vondran | 106/711 |
| 5,320,450 | 6/1994 | Smith | 405/129 |
| 5,328,508 | 7/1994 | Lin | 106/737 |

*Primary Examiner*—Karl Group
*Assistant Examiner*—Michael Marcheschi
*Attorney, Agent, or Firm*—Michael I. Kroll

[57] ABSTRACT

The present invention relates to a ready mixed cement product for home or commercial use which is premixed and prepackaged incorporating recycled construction and demolition debris in place of virgin stone. The present invention also relates to methods for making and using this ready mixed cement product.

1 Claim, 2 Drawing Sheets

READY MIXED CEMENT PRODUCT INCORPORATING MATERIAL FROM CONSTRUCTION AND DEMOLITION DEBRIS

BACKGROUND OF THE INVENTION

FIELD OF THE INVENTION

The instant invention relates generally to ready mixed cement products and more specifically it relates to a ready mixed cement product for home or commercial use which is premixed and prepackaged incorporating recycled components in place of virgin stone. The present invention also relates to methods for making and using this ready mixed cement product.

SUMMARY OF THE INVENTION

The present invention relates to a ready mixed cement product for home or commercial use which is premixed and prepackaged incorporating recycled components in place of virgin stone. The present invention also relates to methods for making and using this ready mixed cement product.

Essentially, the method of making this ready mixed cement product is as follows: the mixed construction and demolition debris which comprises both recyclable and nonrecyclable materials is separated into its recyclable and nonrecyclable components. Then the recyclable materials are combined and crushed to obtain recycled aggregate. Next, the recycled aggregate is mixed with cement, to obtain a mixture of recycled aggregate and cement. Then either gravel or sand (depending on the contemplated end use) is mixed with the mixture of recycled aggregate and cement, to obtained a mixture of recycled aggregate, cement, and gravel or sand. Optionally a fiber mix is added if it is desired that the cement be fiber reinforced.

The method of making this fiber mix is as follows: First fibers are separated from such materials as recycled fiberglass, recycled tires, and recycled carpet material. Then the recycled fibers are ground to produce a fiber mix.

A primary object of the present invention is to provide a ready mixed cement product utilizing recycled components in place of virgin stone.

Another object is to provide a method for making this ready mixed cement product.

An additional object is to provide a method of using this ready mixed cement product.

A further object is to provide a ready mixed cement product which incorporates recycled fibers extracted from recyclable fiberglass, tires, and carpet material so as to produce a fiber reinforced cement gravel or sand mix.

A still further object is to provide a method for making a ready mixed cement product which incorporates recycled fibers.

It is yet another object of this invention to provide a method of using a ready mixed cement product which incorporates recycled fibers.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific method illustrated and described within the scope of the appended claims.

BRIEF DESCRIPTION OF THE DRAWING FIGURES

DETAILED DESCRIPTION OF THE PREFERRED EMBODIMENTS

Figure 1:
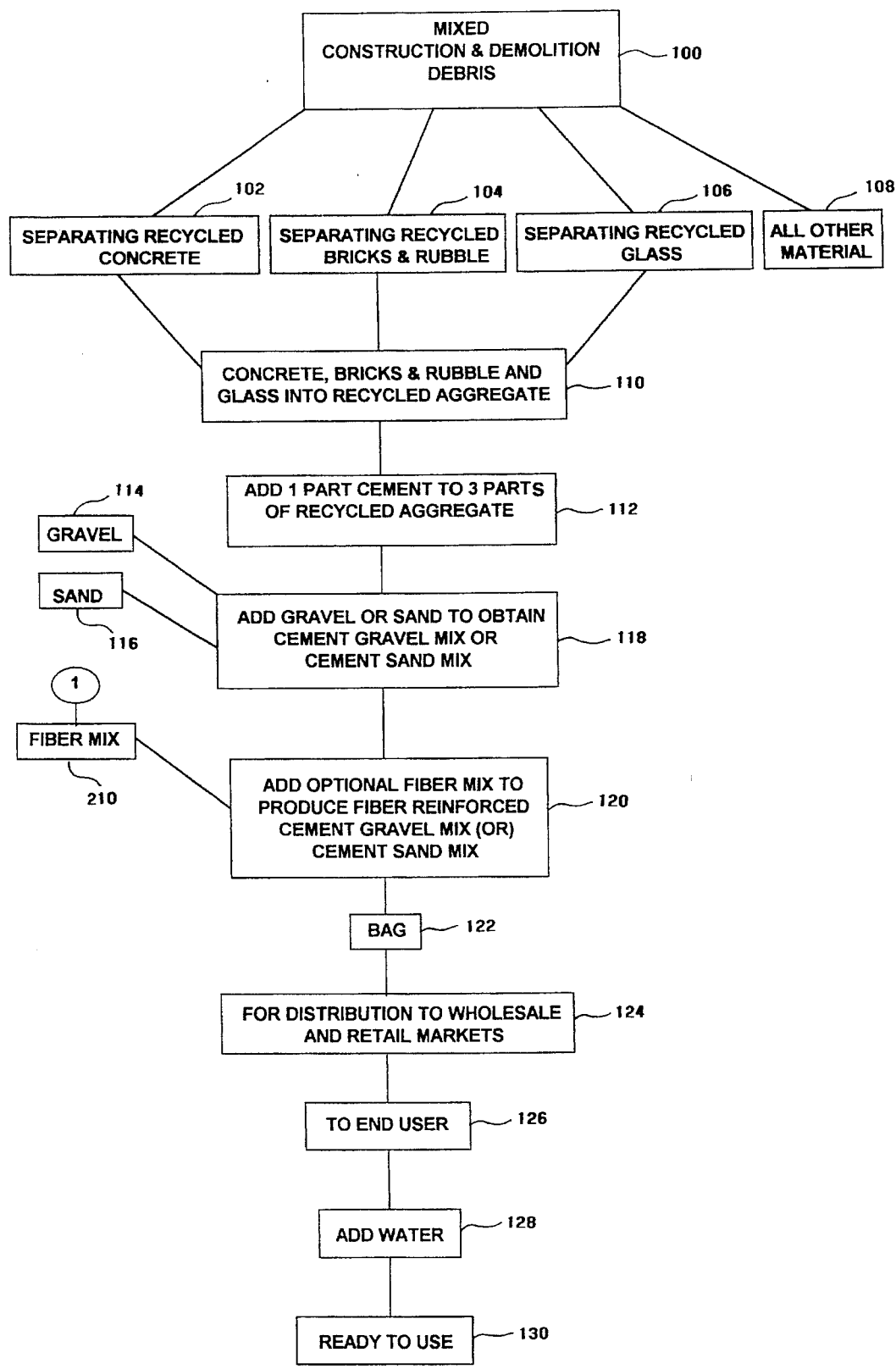
FIG. 1 is a diagrammatic representation of a method of making and using a cement gravel or sand mix with optional fiber mix added.

First, reference is made to FIG. 1 which is a diagrammatic representation of a method of making and using a cement gravel or sand mix with optional fiber mix added. As shown in FIG. 1, mixed construction and demolition debris 100 comprising some materials which can be recycled and other materials which cannot be recycled is separated into its recyclable and nonrecyclable components. Ordinarily the recyclable component includes recyclable concrete, recyclable bricks and rubble, and recyclable glass. The first step, therefore, is to separate out the recyclable concrete 102, recyclable bricks and rubble 104, and recyclable glass 106, and to discard all the remaining nonrecyclable materials 108. Next the recyclable concrete, bricks and rubble, and glass are combined and crushed to obtain recycled aggregate 110. Then 3 parts of recycled aggregate is mixed with 1 part cement 112. Next, either gravel 114 or sand 116 (depending on the desired end use) is added and mixed to obtain cement gravel mix or cement sand mix 118.

Optionally, fiber mix 210 may be added to obtain fiber reinforced cement gravel mix or fiber reinforced cement sand mix 120. Next the cement gravel or sand mix is packaged in convenient sized bags 122. Then, using normal distribution channels, the bagged cement sand or gravel mix is distributed to the wholesale and retail markets 124.

Upon the end user obtaining the cement sand or gravel mix 126, he merely needs to add water to the cement sand or gravel mix 128 and mix sufficiently to thoroughly wet the mix thus obtaining ready to use cement 130.

Figure 2:
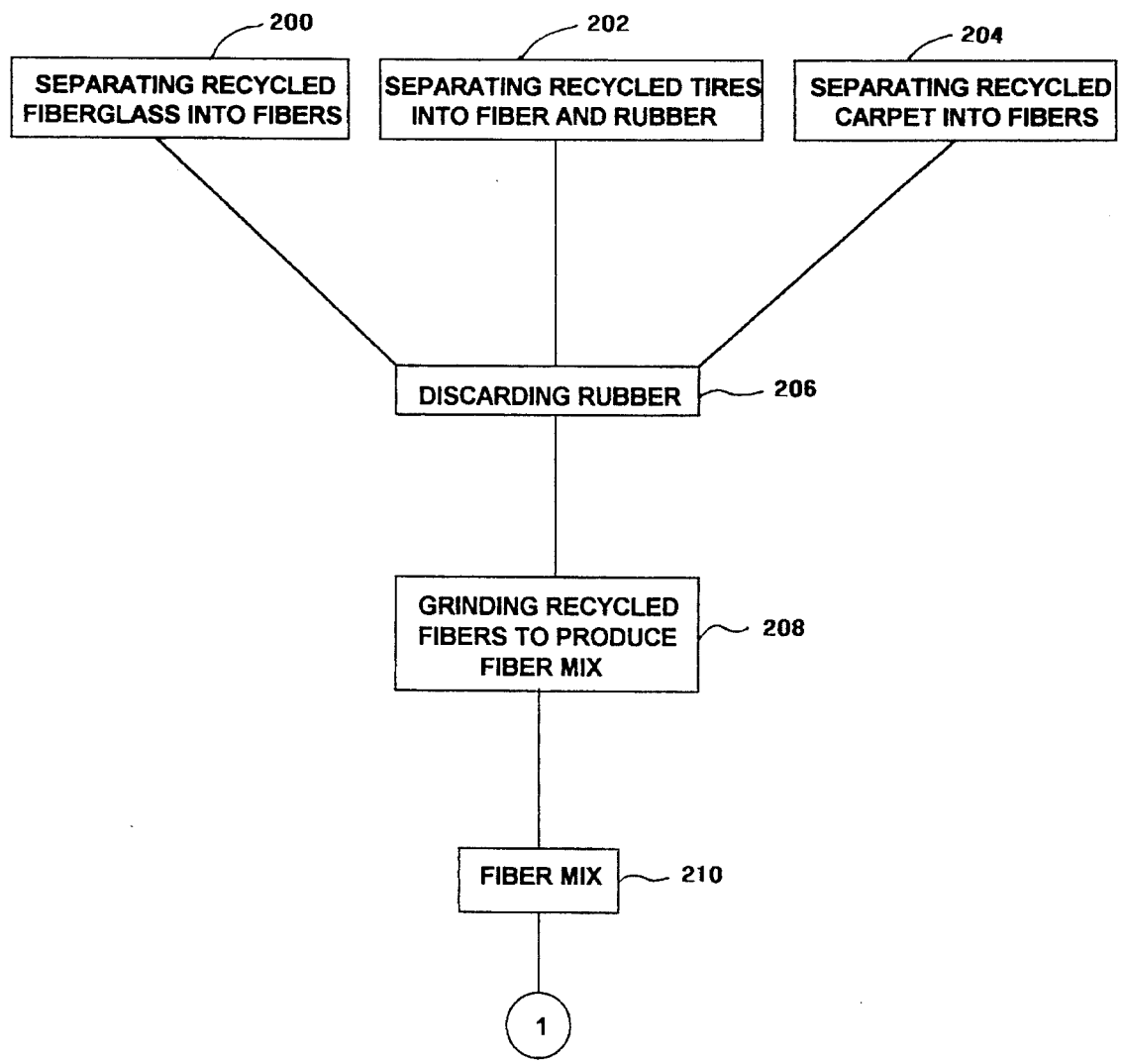
FIG. 2 is a diagrammatic representation of a method of producing the optional fiber mix.

Now, reference is made to FIG. 2 which is a diagrammatic representation of a method of producing the fiber mix which is optionally added to the mixture of recycled aggregate, cement, and gravel or sand as shown in FIG. 1. As shown in FIG. 2, recycled fiberglass is separated into fibers 200. Then recycled tires are separated into fiber and rubber 202, and the rubber is discarded 206. Now recycled carpet is separated into fibers 204. Then the fibers which were separated out from the fiberglass, tires, and carpet are ground to produce fiber mix 208, thus yielding resultant fiber mix 210. The fiber mix 210 is then added to and mixed with the mixture of recycled aggregate, cement, and gravel or sand as shown by number 120 in FIG. 1.

LIST OF REFERENCE NUMBERS USED IN THE DRAWINGS

100—mixed construction and demolition debris

102—process step of separating recycled concrete

106—process step of separating recycled bricks and rubble

108—process step of separating recycled glass

108—process step of separating all other material

110—process step of combining and crushing concrete, bricks and rubble, and glass to obtain recycled aggregate 112—process step of mixing 3 parts of recycled aggregate with 1 part cement 114—gravel 116—sand 118—process step of adding gravel or sand to obtain cement gravel mix or cement sand mix 120—optional process step of adding fiber mix to produce fiber reinforced cement gravel mix or fiber reinforced cement sand mix 122—process step of packaging cement sand or gravel mix in convenient sized bags 124—process step of distributing the bagged cement sand or gravel mix to wholesale and retail markets 126—process step of distributing the cement sand or gravel mix to the end user.

128—process step of adding water to the cement sand or gravel mix.

130—ready to use cement sand or gravel mix.

200—process step of separating recycled fiberglass into fibers

202—process step of separating recycled tires into fiber and rubber

204—process step of separating recycled carpet into fibers

206—process step of separating rubber from fiber and discarding the rubber

208—process step of grinding recycled fibers to produce fiber mix

210—resultant fiber mix

It will be understood that each of the process steps described above, or two or more together may also find a useful application in other types of methods differing from the type described above.

While certain novel features of this invention have been shown and described and are pointed out in the annexed claims, the invention is not intended to be limited to the details above, since it will be understood that various omissions, modifications, substitutions and changes in the forms and details of the processes illustrated can be made by those skilled in the art without departing in any way from the spirit of the present invention.

Without further analysis, the foregoing will so fully reveal the gist of the present invention that others can, by applying current knowledge, readily adapt it for various applications without omitting features that fairly constitute essential characteristics of the generic or specific aspects of this invention.

What is claimed is new and desired to be protected by Letters Patent is set forth in the appended claims.

What is claimed is:

1. A method of making a ready mixed cement product, said method comprising the steps of:

a) separating out concrete, bricks and rubble, and glass from mixed construction and demolition debris;

b) combining and crushing said separated concrete, bricks and rubble, and glass to obtain recycled aggregate;

c) mixing three parts by weight of said recycled aggregate with one part by weight of cement to form a mixture;

d) mixing a material selected from the group consisting of gravel and sand with the mixture of step c to form a mixed cement product;

e) separating fibers from materials selected from the group consisting of waste fiberglass, tires, and carpet material;

f) grinding the separate fibers to produce a fiber mix; and g) adding said fiber mix to said cement product to form said ready mixed cement product.

* * * * *